United States Patent [19]

Erickson

[11] Patent Number: 4,531,306
[45] Date of Patent: Jul. 30, 1985

[54] FOOD DEHYDRATOR WITH MOISTURE SENSING CONTROL

[75] Inventor: Chad S. Erickson, Maple Grove, Minn.

[73] Assignee: Alternative Pioneering Systems, Inc., Bloomington, Minn.

[21] Appl. No.: 455,924

[22] Filed: Jan. 6, 1983

[51] Int. Cl.³ .............................................. F26B 21/10
[52] U.S. Cl. ............................................ 34/44; 34/48; 34/54; 34/225; 99/331; 99/483
[58] Field of Search .................. 34/195, 196, 197, 225, 34/233, 46, 48, 54, 44; 99/331, 483

[56] References Cited

U.S. PATENT DOCUMENTS

| | | |
|---|---|---|
| 2,591,213 | 4/1952 | Stupin et al. |
| 2,606,372 | 8/1952 | Foulder et al. |
| 2,767,484 | 10/1956 | Gilson |
| 3,324,566 | 6/1967 | Dietert .................................... 34/54 |
| 4,192,081 | 3/1980 | Erickson et al. ...................... 99/483 |
| 4,256,029 | 3/1981 | Steffen et al. |

OTHER PUBLICATIONS

Pamphlet, National Semiconductor, LM1830 Fluid Detector.

Primary Examiner—Larry I. Schwartz
Attorney, Agent, or Firm—Merchant, Gould, Smith, Edell, Welter & Schmidt

[57] ABSTRACT

The present invention relates to a countertop food dehydrator including moisture sensing mechanism which controls the on-off operation.

11 Claims, 5 Drawing Figures

FIG. I
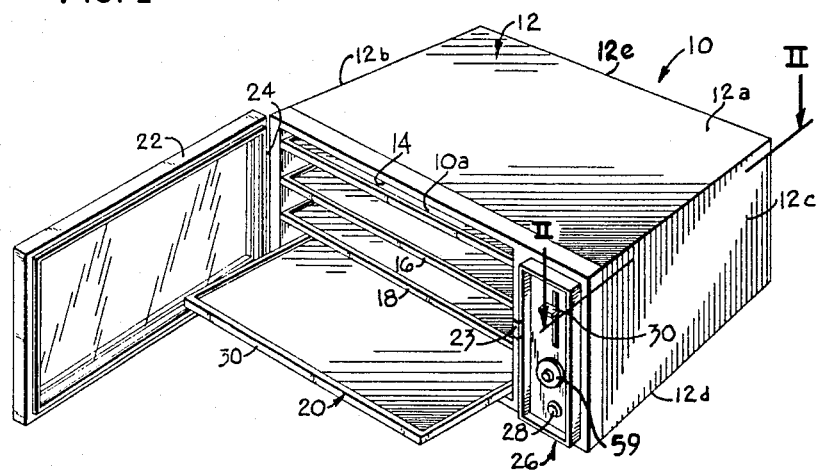
FIG. II
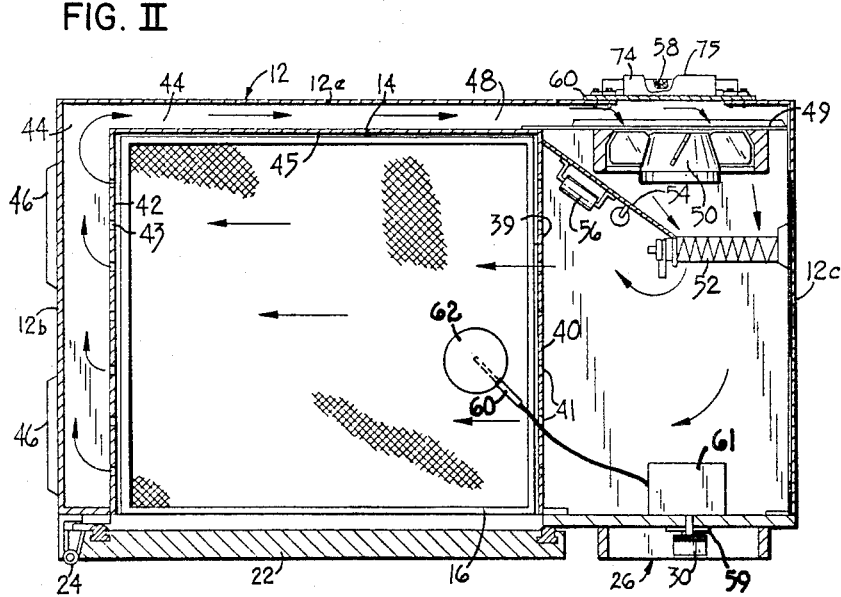

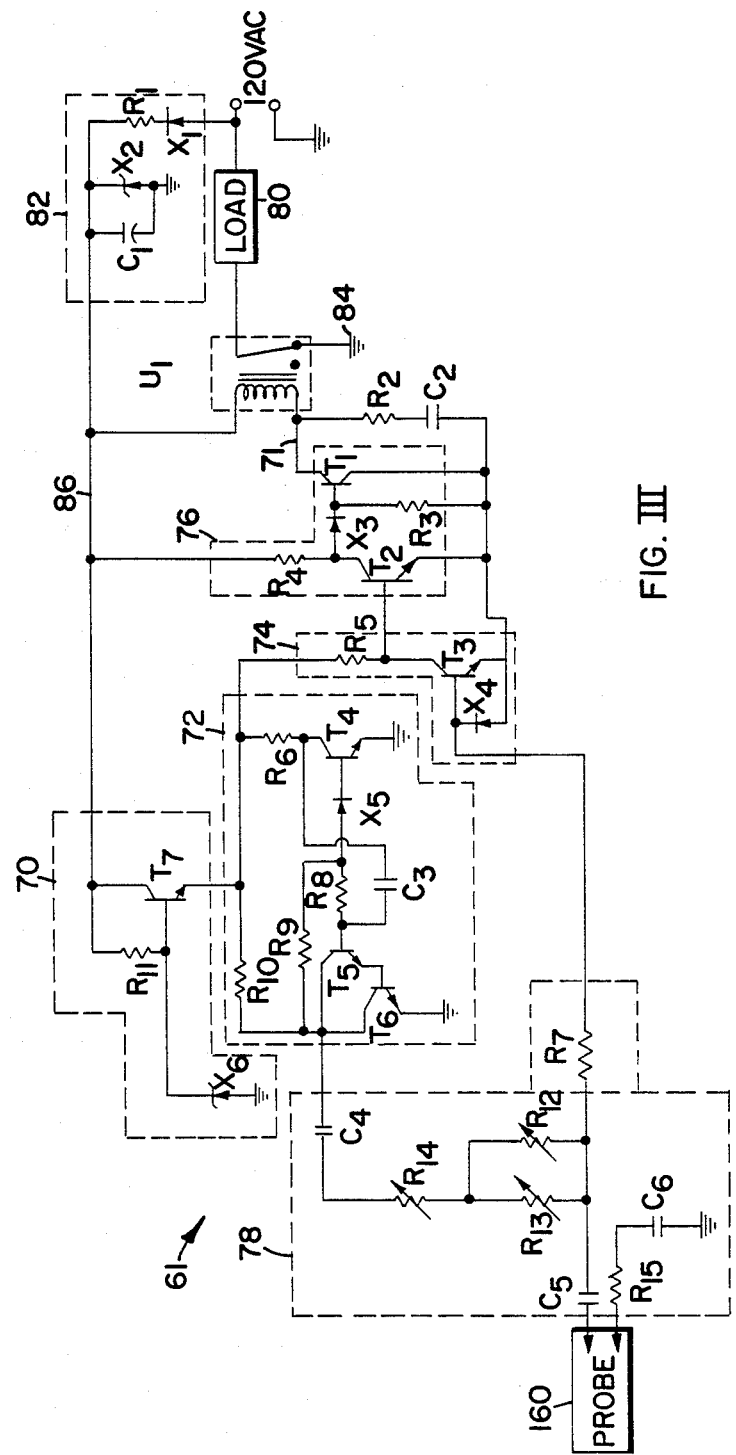
FIG. III

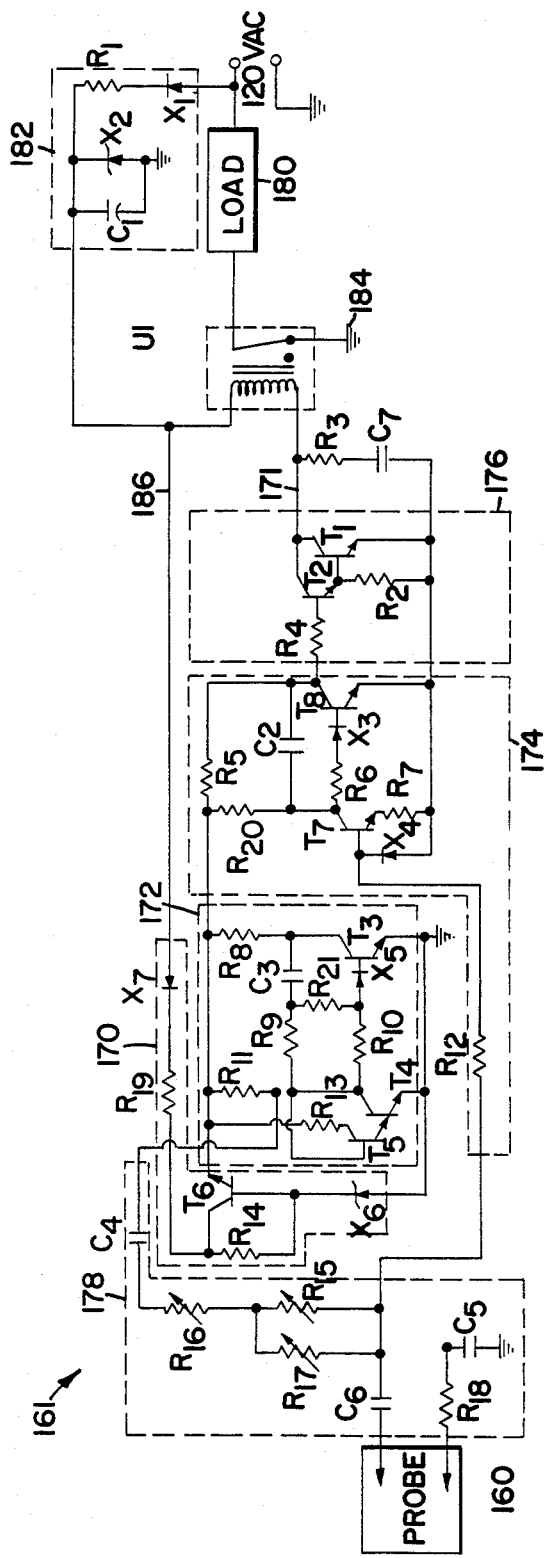
FIG. IV

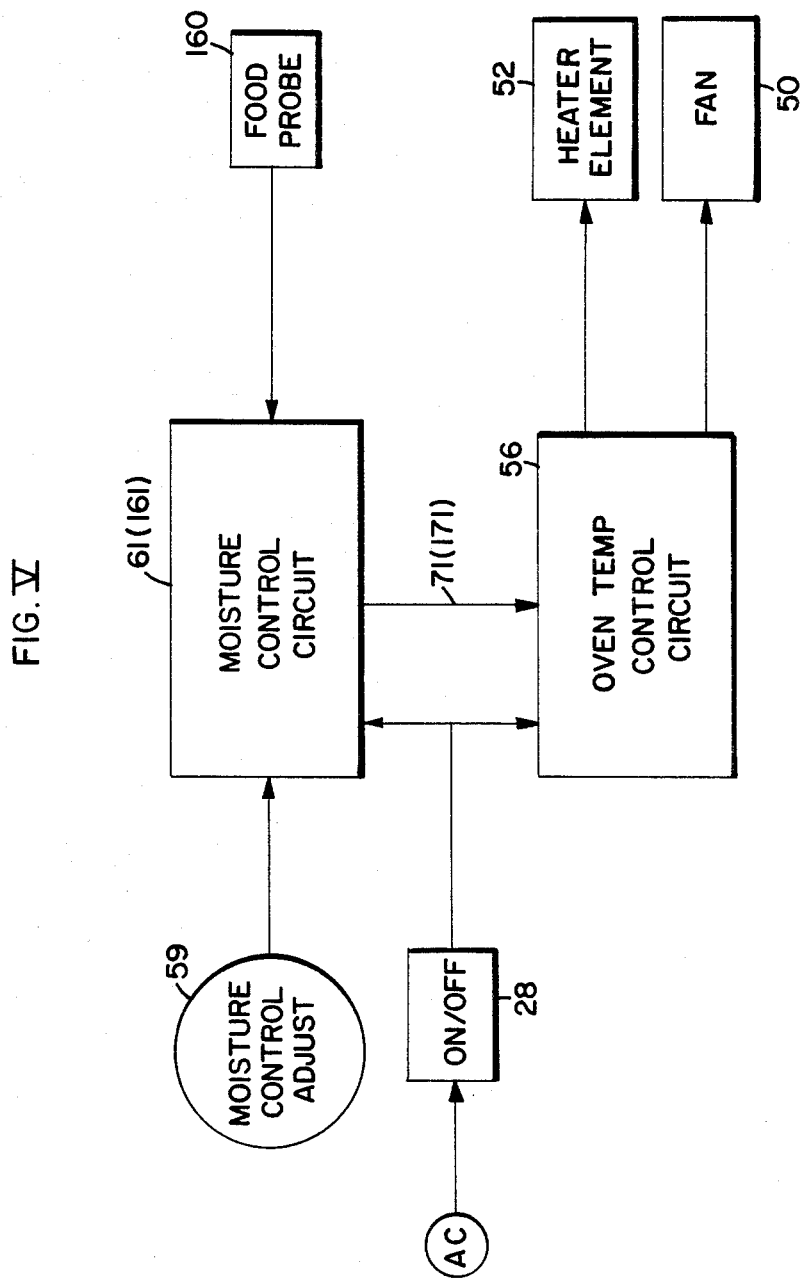

FOOD DEHYDRATOR WITH MOISTURE SENSING CONTROL

The present invention relates to electrically powered food dehydrators and, more particularly to such food dehydrators including a moisture sensing mechanism.

Food dehydration is an ancient art. Early food dehydration was carried out by drying food products such as vegetables and meat in the sun. Dehydrating food products in the sun is still practiced today. There are, however, many advantages to the newer methods of food dehydration. In particular, dehydrating food products in an electrically powered food dehydrator such as the types shown in U.S. Pat. Nos. 4,190,965, 4,192,081, and 4,224,743, is much more rapid, cleaner, and less likely to result in the loss of food due to spoilage. Although the afore-identified electrically powered food dehydrators are highly satisfactory, one problem still remains, namely that the individual operating the food dehydrator must observe the food pieces during dehydration to turn the dehydrator off once a satisfactory level of dehydration has been accomplished.

In many instances, the level of dehydration is not critical so long as the food pieces achieve a shelf stable condition. However, excessive dehydration consumes an unneeded amount of electrical energy, thus losing a certain degree of efficiency. Also, there are other instances where one may desire to achieve only a particular desired level of dehydration. This, for example, may be the case in preparing jerky, where one wishes to maintain the presence of a certain level of moisture in order to provide a tough, chewable product.

SUMMARY OF THE PRESENT INVENTION

The present invention relates to a dehydrator including mechanism for sensing the moisture content of the food pieces during the dehydration process. The sensing mechanism in the present invention includes a signal generating circuit which operates a relay switch. The signal generating circuitry produces a high frequency signal which may be transmitted through a medium having an elevated moisture content. The circuitry includes a signal generator, an amplifier, and a receiver. The relay in turn provides switching for turning the power on and off to the heating element and the fan of the dehydrator. Transmission and receipt of the high frequency signal maintains the relay switch automatically in an "on" position. Once a signal is no longer being transmitted through the food piece, the relay automatically moves to a condition where the electrical power is turned off. The sensing mechanism preferably includes a probe which is extended into the food piece. It is between a pair of contact points on the probe that the high frequency signal is transmitted, with the food being disposed between such contact points.

BRIEF DESCRIPTION OF THE DRAWINGS

FIG. I is a perspective view of a dehydrator according to the present invention;

FIG. II is a sectional view taken along the lines II—II in FIG. I and showing a sensing probe in accordance with the present invention;

FIG. III is a schematic view of one control circuit suitable for use in the present invention;

FIG. IV shows a schematic view of another control circuitry suitable for use in the present invention; and FIG. V shows in block diagrammatic form a circuit configuration suitable for use in the present invention.

DETAILED DESCRIPTION OF THE PRESENT INVENTION

One embodiment of the present invention is illustrated in FIGS. I and II in which the food dehydrator 10 includes an outer shell 12 formed, for example, from sheet metal. The outer shell 12 includes a top 12a, left and right sides 12b and 12c, bottom and rear walls 12d and 12e. The food dehydrator 10 has a front opening 10a which provides access into the drying chamber 14 containing a plurality of horizontal trays extending across the drying chamber 14. Certain trays, 16 and 18, are shown totally inserted into the chamber 14. A further tray, 20, is shown partially inserted into the unit. The trays 16, 18 and 20 are slightly smaller in both length and width than the corresponding dimensions of the drying chambers 14 such that the trays may be easily inserted into and removed from the chamber 14. Suitable supports may be included in the side walls of the drying chamber 14.

A door 22 is suitably mounted on the cabinet such as by hinges 24. The door 22 serves to close and seal the front opening 10a of the drying chamber 14 during operation. A latching mechanism may be provided, such as magnetic latch 23, to secure the door in the closed position. Alternatively, the door 22 may be secured in place using any suitable mechanism so long as the door 22 seals the opening during use. For example, the door 22 may be merely hung in place using suitable hooks.

The food dehydrator 12 has a control panel 26 including an on/off switch 28 and a slide dial temperature control 30. The slide control may have a plurality of calibration marks to permit selection of the desired air drying temperature. The structure of the various trays 16, 18 and 20 may be substantially as described in U.S. Pat. No. 4,192,081. Alternatively, any other type of suitable tray may be used.

The air circulation and air heating mechanism can be seen in FIG. II. A plenum chamber 39 is provided in the rightward portion of the food dehydrator 10. The plenum chamber 39 is separated from the drying chamber 14 by a wall 40 containing rows of horizontal openings 41 to feed air over each of the trays.

The ratio of air flow to the open area in wall 40 is such that a mild positive pressure is created in the upstream side of wall 40. The pressure is sufficient to force air through all of the openings in wall 40 at a substantially uniform rate. One satisfactory embodiment of the present invention includes a wall 40 of 127.5 square inches with an open area of 26.5%. A suitable fan 50 is provided to move air through the dehydrator, for example, at a rate of approximately 45 cubic feet per minute. The air velocity in the wall openings in such embodiment was about 200 linear feet per minute and the pressure on the upstream side of wall 40 was found to be about 0.03 inches of water above ambient pressure.

A second wall 42 at the leftward side of the chamber 14 also contains a plurality of horizontal openings 43 which allow egress of air into a zone 44 defined by the walls 42 and 45 of chamber 14, and the outer shell 12 of the dryer 10. The wall 42 desirably is at least as open as wall 40 and may be somewhat more open. The rear wall 45 of the drying chamber 14 desirably is solid, e.g. without openings. During normal operation, the front opening 10a is sealed by the door 22. A set of louvres 46 at the leftward side of the outer shell 12 provides an exhaust path for air from the zone 44 to the outside atmosphere. The louvres 46, if desired, may be adjustable to an open or closed position. A rear duct 48 provides a return path for air to the plenum chamber 39. An electrical motor may drive the fan 50 to move air through the electrical heating element 52. A baffle 54 directs the air flow from the fan 50 to the area of the heating element 52. Electrical control elements 56 regulate the amount of power delivered to the heating element. A filter 58 may be mounted at the rear of the food dehydrator 10 for removing dust and other airborne particles from the air entering the unit.

The dehydrator 10 has a control knob 59, a moisture sensing probe 160 and suitable sensing circuitry 61 for sensing the moisture content of a food piece 62. One embodiment of moisture sensing control circuitry 61 is illustrated in FIG. III, in which the various groups of components performing distinctive functions are identified by phantom line blocks. Resistor $R_{11}$, transistor $T_7$, and Zener diode $X_6$ form a power supply regulation circuit 70. The emitter of transistor $T_7$ delivers a regulated power to an oscillator circuit 72 and detector circuit 74. Oscillator circuit 72 includes resistors $R_6$, $R_8$, and $R_9$, transistors $T_4$, $T_5$, and $T_6$, capacitor $C_3$, and diode $X_5$. Detector circuit 74 includes a resistor $R_5$, a transistor $T_3$, and a diode $X_4$.

The output of oscillator 72 is taken from the connected collectors of transistors $T_5$ and $T_6$ for input to the probe network 78. Probe network 78 includes potentiometers $R_{12}$, $R_{13}$ and $R_{14}$, which may be adjusted to accommodate a range of conductivities of the fluid to be sensed, capacitor $C_4$, $C_5$ and $C_6$, and resistors $R_7$ and $R_{15}$. The probe 160 connects to the output of network 78.

A detector circuit 74 receives an input from $R_7$ of network 78 at the base of transistor $T_3$. A pull-up resistor $R_5$ is connected to the collector of transistor $T_3$, which has a diode $X_4$ tied from its emitter to its base. The output of detector circuit 74, which is taken from the collector of transistor $T_3$, is input to an amplifier and output circuit 76 comprising transistors $T_1$ and $T_2$, resistors $R_3$ and $R_4$ and a diode $X_3$.

The output of circuit 76 is taken off the collector of transistor $T_1$ on conductor 71, which is connected to the coil of relay $U_1$. A resistor $R_2$ and capacitor $C_2$ protect against transient current surges through transistor $T_1$ during transitions thereof. In its normal position, relay $U_1$ holds load 80 in an activated condition with the low side thereof connected to ground potential 84. When activated, relay $U_1$ opens the load circuit to cause it to deactivate. Load 80 is connected on its high side thereof to a 120 VAC power source which is also connected to diode $X_1$ of rectifying circuit 82. Rectifying circuit 82 includes in addition to diode $X_1$ a resistor $R_1$, a Zener diode $X_2$, and a capacitor $C_1$ in order to produce a rectified DC voltage on conductor 86.

For the circuits of FIG. III the following component valves are preferred: $R_1=2.7K$, 2 watt; $R_2=1M$; $R_3=10K$; $R_4=10K$; $R_5=25K$; $R_6$ 25K; $R_7$ 22K; $R_8=30K$; $R_9=10K$; $R_{10}=9.6K$; $R_{11}=10K$; $R_{12}=1M$; $R_{13}=200K$; $R_{14}=100K$; $R_{15}=15K$; $X_1=1$ Amp, 200 V; $X_2=12$ V, 1 Watt Zener; $X_3=1$ Watt; $X_4=1$ Watt; $X_5=1$ Watt; $X_6=7$ V Zener; $C_1=220$ uf; $C_2=220$ uf; $C_3=180$ pf; $C_4=0.1$ uf; $C_5=0.001$ uf; $T_1=10$ Amp, 200 V; $T_2=0.8$ Amp, 200 V.

An alternative sensing control circuit 161 is illustrated in FIG. IV. In FIG. IV, the functional groupings of components which correspond to the circuits of FIG. III bear like reference numbers, except are prefixed with a "1." Regulator circuit 170 includes a diode $X_7$, a transistor $T_6$, a Zener diode $X_6$ and resistors $R_{14}$ and $R_{19}$. Oscillator circuit 172 includes resistors $R_4$, $R_8$, $R_9$, $R_{10}$ and $R_{13}$, transistors $T_3$, $T_4$ and $T_5$, a diode $X_5$, and a capacitor $C_3$. Detector circuit 174 includes resistors $R_5$, $R_6$, $R_7$, $R_{12}$ and $R_{20}$, a capacitor $C_2$, diodes $X_3$ and $X_4$, and transistors $T_7$ and $T_8$. Amplifier and output circuit 176 includes resistors $R_2$, $R_3$ and $R_4$, transistors $T_1$ and $T_2$, and a capacitor $C_7$. Probe output circuit 178 includes potentiometers $R_{15}$, $R_{16}$ and $R_{17}$, capacitor $C_5$ and $C_6$, and a resistor $R_{18}$. Rectifying circuit 182 includes a diode $X_1$, a resistor $R_1$, zenor diode $X_2$, and a capacitor $C_1$. Load 180 is connected to a relay $U_1$ in the same manner as explained with respect to the circuitry of FIG. III.

For the circuits of FIG. IV the following component values are preferred: $R_1=2.7K$, 2 Watt; $R_2=10M$; $R_3=1M$; $R_4=4.7K$; $R_5=4.7K$; $R_6=22K$; $R_7=270$; $R_8=4.7K$; $R_9=2.5K$; $R_{10}=4.7.6K$; $R_{11}=4.7K$; $R_{12}=26.7K$; $R_{13}=4.7K$; $R_{14}=4.7K$; $R_{15}=1M$; $R_{16}=100K$; $R_{17}=220K$; $R_{18}=15K$; $R_{19}=470$ ohms; $R_{20}=22K$ ohms; $C_1=220$ uf; $C_2=0.1$ uf; $C_3=180$ pf; $C_4=0.1$ mf; $C_5=0.0001$ uf; $C_6=0.001$ uf; $C_7=20$ uf; $X_1=1$ Amp, 200 V; $X_2=12$ V, 1 Watt Zener; $T_1=10$ Amp; 200 V; $T_2=0.8$ Amp, 200 V.

In each of the above described embodiments of the moisture sensing control circuits 61 and 161, like functional blocks function in a like manner, as follows. Regulator circuitry 70 (170) provides a regulated DC voltage to oscillator circuit 72 (172) and detector circuit 74 (174). Oscillator circuit 70 (170) produces an AC signal which is delivered to the probe output circuit 78 (178). Detector circuit 74 (174) compares the loaded probe resistance with a known resistance, to determine the amount of fluid at the probe 160 site. Detector 74 (174) drives amplifier and output circuit 76 (176) which in turn controls the relay $U_1$ through output conductor 71 (171). In operation, relay $U_1$ holds the load 80 (180) in an activated condition until the fluid or moisture content of the food piece 62 falls below a level preset through the adjustment of the probe output circuit potentiometers. When the suitable moisture content is achieved, detector 74 (174) causes output circuit 76 (176) to energize relay $U_1$ and thereby open the load circuit and deactivate the heating element.

In FIG. V there is illustrated in block diagram form the preferred configuration of the oven control circuits of the present invention. Output 71 (171) of moisture control circuit 61 (161) is received by oven temperature control circuit 56. Control circuit 56 responds to the moisture control signal from output 71 (171) and the oven temperature to control oven heater element 52 and oven fan 50 during the drying process. Thus, the rate of dehydration may be controlled through the thermostatic setting of the oven, independently of the food piece moisture content or dehydration level. As illustrated by the on/off control 28, the oven may be powered by a household AC power source, and may be switched on and off via the front panel as hereinbefore mentioned.

OPERATION OF THE PRESENT INVENTION

The present invention can be best understood by referring to FIG. II. The dryer 10 is placed in operation by first connecting the unit to a suitable power source such as 120 volt alternating house current. The unit is then switched to an "on" position by activating the switch 28. The food pieces are placed on the various shelves 16, 18 and 20. The probe 60 is inserted into a representative piece of material to be dehydrated. Desirably, the food piece is located in a representative position within the dehydrator 10 such that when piece 62 is dehydrated, the other pieces located throughout the dehydrator are also dried to a similar level. The slide control 30 is adjusted to a desired temperature level. Finally, using the moisture control adjustment 59, which depending on the range of moisture content sought to be sensed may correspond to any one of potentiometers of circuits 78 and 178, the control 61 (161) is adjusted to the desired level of final dehydration. The unit is then in operating condition and dehydration may take place over several hours. Circuitry 61 (161) generates an AC signal, the attenuation level of which varies according to the resistance presented at the probe site. As the level of moisture content falls to the desired level, the corresponding variance in attenuation of the AC signal is detected by circuitry 61 (161), which in turn energizes relay $U_1$ and opens the heater circuit. If the moisture content of the piece 62 is uneven such that the area contacted by the probe 160 is dehydrated to a lower level than other positions of the piece 62, the unit may lie idle while the moisture equilibrates in the piece 62 and the unit is then switched on by the eventual deactivation of relay $U_1$ if the moisture content adjacent the probe 160 rises above the predetermined level.

Although various modifications may be made to the present invention, the overall concept is illustrated by the circuitry of FIGS. III, IV and V.

What is claimed is:

1. A food dehydrator comprising an enclosed dehydrating zone, defined by wall means, said zone including a plurality of superimposed spaced shelves, means for moving an airstream through said enclosed zone, means for heating said airstream, moisture sensing means for sensing the moisture content within the product to be dehydrated so as to avoid invalid moisture content readings due to premature drying of the outside surface of the product relative to the inside, means to disable said heating means and said air moving means dependent on said moisture sensing.

2. The food dehydrator of claim 1, wherein said moisture sensing means include a signal generating means for generating a signal capable for conduction through a moisture containing food piece, said sensing means further including receiver means for receiving said conducted signal.

3. The food dehydrator of claim 2, wherein said generating means and said receiver means are both contained within probe means, for insertion into a food piece.

4. The food dehydrator of claim 3 wherein said receiver means includes a multistage amplifier.

5. The food dehydrator of claim 4 wherein said signal generator means provides a signal in the range of 20 to 30 kilocycles.

6. A food dehydrator comprising wall means defining a dehydration chamber, means for supporting food pieces within said dehydration chamber, means for sensing the moisture content within the food pieces to be dehydrated to avoid invalid moisture content readings due to premature drying of the outside relative to the inside of said pieces, means for moving a heated airstream through said dehydration chamber, control means associated with said sensing means to disable said airstream means upon sensing the food piece moisture falling below a determinable level.

7. The food dehydrator of claim 6 wherein said control means are adjustable to vary the moisture level at which said airstream means is disabled.

8. An accessory for a food dehydrator, said dehydrator including a plurality of superimposed spaced shelves, means for moving an airstream through said enclosed zone, and means for heating said airstream, said accessory comprising:
   (a) control means for sensing the level of moisture within the food pieces to be dehydrated so as to avoid invalid moisture content readings due to premature drying of the outside surface of the product relative to the inside, said control means and said heating means once a desired level of dehydration is achieved.

9. The accessory of claim 8 wherein said control means includes a signal transmitter and a signal receiver.

10. The accessory of claim 9 wherein said receiver includes a multistage amplifier.

11. The accessory of claim 10 wherein said signal transmitter provides a signal in the range of 20 to 30 kilocycles.

* * * * *

UNITED STATES PATENT AND TRADEMARK OFFICE
CERTIFICATE OF CORRECTION

PATENT NO.  : 4,531,306
DATED       : July 30, 1985
INVENTOR(S) : Chad S. Erickson It is certified that error appears in the above-identified patent and that said Letters Patent is hereby corrected as shown below:

Column 3, line 60, delete "$R_6$ 25K" and insert --$R_6=25K$--.

Column 3, line 60, delete "$R_7$ 22K" and insert --$R_7=22K$--.

Column 3, line 59, delete "valves" and insert --values--.

Signed and Sealed this

Fourth Day of March 1986

[SEAL]

*Attest:*

DONALD J. QUIGG

*Attesting Officer*      *Commissioner of Patents and Trademarks*